United States Patent
Zhu et al.

(10) Patent No.: US 6,835,300 B2
(45) Date of Patent: Dec. 28, 2004

(54) ELECTROPOLISHING SOLUTION AND METHODS FOR ITS USE AND RECOVERY

(75) Inventors: Joseph Shoulian Zhu, Jacksonville, FL (US); Bang Mo Kim, Schenectady, NY (US); Jeffery L. Schworm, Delanson, NY (US); Kevin C. Green, Rutland, VT (US); Paul Guilmette, Rutland, VT (US)

(73) Assignee: General Electric Company, Niskayuna, NY (US)

( * ) Notice: Subject to any disclaimer, the term of this patent is extended or adjusted under 35 U.S.C. 154(b) by 97 days.

(21) Appl. No.: 10/065,057

(22) Filed: Sep. 13, 2002

(65) Prior Publication Data

US 2004/0050715 A1 Mar. 18, 2004

(51) Int. Cl.[7] .............................. B23H 3/00; C25F 3/16
(52) U.S. Cl. ....................................... 205/676; 252/62.2
(58) Field of Search ............................. 252/62.2, 79.1; 205/640, 674, 675, 676, 684

(56) References Cited

U.S. PATENT DOCUMENTS

| | | | |
|---|---|---|---|
| 2,687,345 A | * | 8/1954 | Murray ...................... 252/79.4 |
| 3,841,978 A | | 10/1974 | Lai |
| 3,856,636 A | | 12/1974 | Grubb |
| 4,189,357 A | | 2/1980 | Riggs, Jr. |
| 4,269,677 A | * | 5/1981 | Blomsterberg .............. 205/646 |
| 6,352,636 B1 | * | 3/2002 | Wei et al. ................... 205/717 |

OTHER PUBLICATIONS

Derwent abstract of SU 789641 B, Dec. 25, 1980.*
M. Eisenberg and R. E. DeLaRue, "Anodic polarization of titanium in nonaqueous base etching solutions" J. Electrochem. Soc. (1958), vol. 105, pp. 162–169, no month.
Chemical Abstract for SU 162395, Apr. 16, 1964.
Chemical Abstract for SU 285434, Oct. 29, 1970.
Chemical Abstract for SU 1657545, Jun. 23, 1991.

* cited by examiner

*Primary Examiner*—Roy King
*Assistant Examiner*—Harry D. Wilkins, III
(74) *Attorney, Agent, or Firm*—Paul J. DiConza; Patrick K. Patnode

(57) ABSTRACT

An electrolyte solution containing an alkylene glycol and a chloride salt is useful for electropolishing metal substrates. An electropolishing method using the electrolyte solution is effective for polishing a varied of metals, including titanium and noble metals. The method avoids the handling and disposal challenges associated with previous methods using etching solutions containing hydrofluoric acid. A method of recycling the spent electrolyte solution is also described.

13 Claims, 1 Drawing Sheet

ELECTROPOLISHING SOLUTION AND METHODS FOR ITS USE AND RECOVERY

BACKGROUND

The sizing, shaping, and surface finishing of metals for complex parts such as turbine blades, impellers, vessels, and the like has often proven to be a challenge. One commonly used method for shaping and finishing metals and metal alloys is etching. However, most commonly used etching solutions employ materials such as hydrofluoric acid that are hazardous to handle and difficult and expensive to dispose of. An alternative to etching is electropolishing, but there is a need for electropolishing materials and methods that achieve high surface smoothness, and are less expensive, less corrosive, and more environmentally friendly than current etching materials and methods.

BRIEF SUMMARY

An electropolishing solution effective for surface finishing of metals comprises about 75 to about 99 weight percent of an alkylene glycol; and about 1 to about 25 weight percent of a chloride salt selected from the group consisting of alkali metal chlorides, alkaline earth metal chlorides, and combinations thereof.

Other embodiments, including an electropolishing method and a method of recovering a spent electropolishing solution, are described in detail below.

DETAILED DESCRIPTION OF THE PREFERRED EMBODIMENTS

Figure 1:
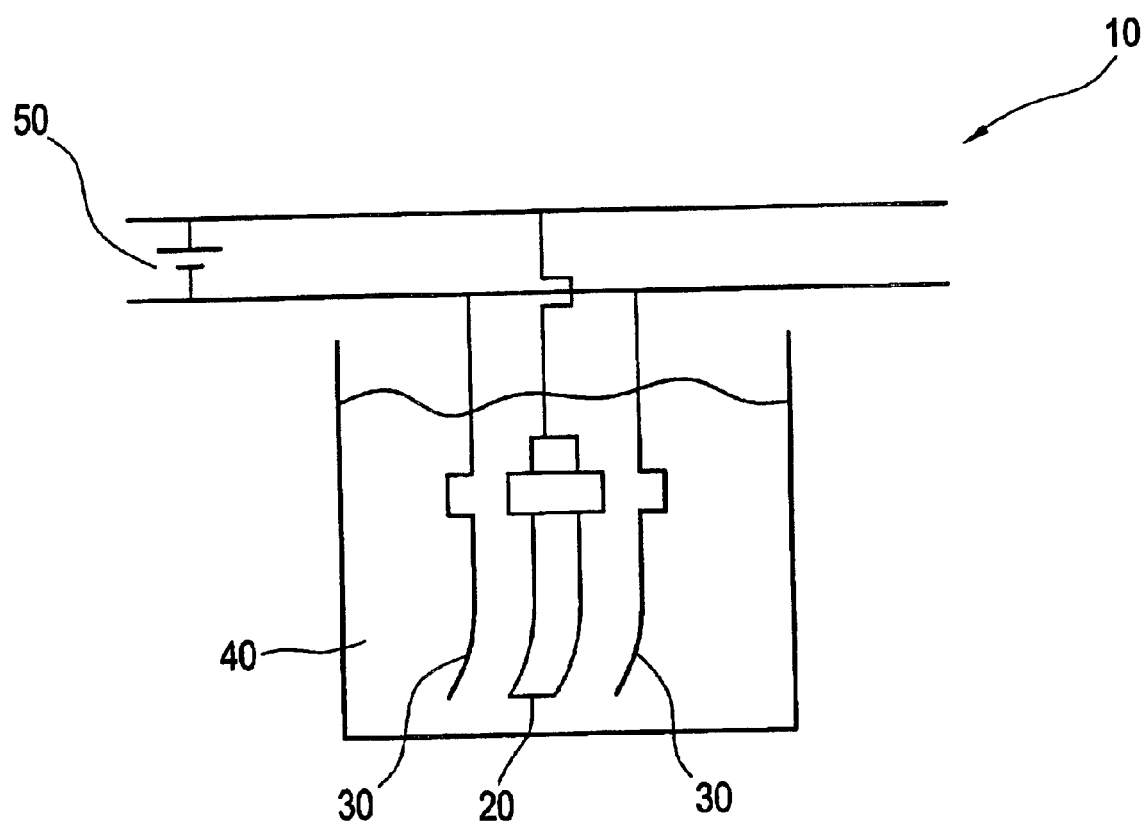
FIG. 1 is a simplified depiction of a system for electropolishing a metallic substrate.

One embodiment is an electropolishing solution comprises about 75 to about 99 weight percent of an alkylene glycol; and about 1 to about 25 weight percent of a chloride salt selected from the group consisting of alkali metal chlorides, alkaline earth metal chlorides, and combinations thereof.

Alkylene glycols suitable for use in the electropolishing solution include, for example, ethylene glycol, 1,2 propylene glycol, 1,3-propylene glycol, glycerol, 1,3-butylene glycol, 1,4-butylene glycol, 2,3-butylene glycol, 1,5-pentanediol, 1,6-hexanediol, 1,8-octanediol, 1,9-nonanediol, 1,10-decanediol, neopentyl glycol, 1,4-cyclohexanedimethanol, 2-methyl-1,3-propanediol, 2,2,4-trimethyl-1,3-pentanediol, diethylene glycol, dipropylene glycol, triethylene glycol, tripropylene glycol, dibutylene glycol, polyethylene glycol, polypropylene glycol, polytetramethylene glycol, and the like, and combinations thereof. A preferred alkylene glycol comprises ethylene glycol or propylene glycol.

Chloride salts suitable for use in the electropolishing solution include, for example, lithium chloride, sodium chloride, potassium chloride, magnesium chloride, calcium chloride, and the like, and combinations thereof. A preferred chloride salt comprises potassium chloride.

It is generally desirable to maximize the purity of the electropolishing solution by minimizing the amount of contaminants such as fluoride ions and water present in the electropolishing solution. Water generally retards the metal removal kinetics and further tends to produce pitting on the finished metal surface. Fluoride ions, particularly when present as hydrofluoric acid, may be hazardous and require expensive disposal or recycling techniques. It is therefore generally desirable to maintain the concentration of fluoride ion to less than or equal to about 0.5 weight percent (wt %), preferably less than or equal to about 0.1 wt %, and more preferably less than or equal to about 0.01 wt % based on the total weight of the electropolishing solution. In a similar manner it is generally desirable to maintain the water in the electropolishing solution to less than or equal to about 5 wt %, preferably less than or equal to about 1 wt %, and more preferably less than or equal to about 0.1 wt % based on the total weight of the electropolishing solution.

In one embodiment, the electropolishing solution comprises about 75 to about 99 weight percent of ethylene glycol, and about 1 to about 25 weight percent of potassium chloride.

In one embodiment, the electropolishing solution consists essentially of about 75 to about 99 weight percent of ethylene glycol, and about 1 to about 25 weight percent of potassium chloride. It will be understood that in this embodiment "consists essentially of" excludes components that substantially detract from the electropolishing properties of the solution.

Another embodiment is an electropolishing method, comprising: disposing a metallic substrate and at least one electrode in an electrolyte solution; wherein the electrolyte solution comprises about 75 to about 99 weight percent of an alkylene glycol, and about 1 to about 25 weight percent of a chloride salt selected from the group consisting of alkali metal chlorides, alkaline earth metal chlorides, and combinations thereof; and applying a current from a power source between the at least one electrode and the metallic substrate to remove metal from the metallic substrate.

In one embodiment of the electropolishing method, the current is applied at a voltage of about 3 to about 100 volts. Within this range, the voltage may preferably be at least about 8 volts, more preferably at least about 15 volts. Also within this range, the voltage may preferably be up to about 80 volts, more preferable up to about 65 volts.

The current may be applied at a current density of about 0.1 to about 20 amperes per square-centimeter ($A/cm^2$), where the denominator represents the total effective surface area of the work piece. Within this range, the current density may preferably be at least about 0.5 $A/cm^2$, more preferably at least about 1.5 $A/cm^2$. Also within this range, the current density may preferably be up to about 10 $A/cm^2$, more preferably up to about 5 $A/cm^2$.

In one embodiment of the electropolishing method, the electrolyte solution has a temperature of about 50 to about 200° C. Within this range, the solution temperature may preferably be at least about 70° C., more preferably at least about 80° C. Also within this range, the solution temperature may preferably be up to about 170° C., more preferably up to about 135° C.

In one embodiment, metal may removed from the metallic substrate at a rate of about 1 to 200 micrometers per minute. Within this range, the metal removal rate may preferably be at least about 5 micrometers per minute, more preferably at least about 10 micrometers per minute. Also within this range, the metal removal rate may preferably be up to about 100 micrometers per minute, more preferably up to about 50 micrometers per minute.

FIG. 1 is a simplified depiction of a system for electropolishing a metallic substrate. In apparatus 10, substrate 20, which functions as an anode, and cathodes 30 are immersed in electropolishing solution 40. Although two cathodes are shown, a single cathode may be used, as can more than two cathodes. A power source 50 applies a current between the cathodes and the metallic substrate to remove metal from the metallic substrate. The cathodes and the substrate may be translated relative to each other to electropolish any desired surface of the substrate.

During the electropolishing of metals, the electropolishing solution often becomes contaminated with metal-containing solid by-products of the electrochemical reactions. For purposes of this disclosure, the electropolishing solution contaminated with the metal-containing solid by-products is referred to as a 'spent electropolishing solution'. The term 'spent electropolishing solution' as defined herein as an electropolishing solution comprising greater than or equal about 0.5 weight percent (wt %) metal-containing solids. In practice, spent electropolishing solutions may contain greater than or equal to about 5 wt % metal-containing solids, and even greater than or equal to about 10 wt % metal-containing solids.

The presence of these metal-containing solids in the electropolishing solution poses a number of problems. Chief amongst these problems is an increase in the viscosity of the electropolishing solution that limits mass transport at the electropolishing solution-work piece interface. This results in changes in the electropolishing kinetics, reductions in the quality of the surface finish and reduced efficiency of the electropolishing cell. It is therefore desirable to separate these metal-containing solids from the electropolishing solution. However, these by-products are very fine particles (e.g., average particle size $\leq 20$ micrometers) of metal-containing solids and are therefore extremely difficult to separate. It has now been unexpectedly discovered that agitation of the spent electropolishing solution containing the metal-containing solids causes these solids to increase in particle size, making them easier to separate from the electropolishing solution, which in turn facilitates recovery and reuse of the solution.

Thus, another embodiment is a method of recovering an electropolishing solution, comprising: agitating a spent electropolishing solution comprising an alkylene glycol, a chloride salt, and a metal-containing solid; and separating the agitated, spent electropolishing solution to yield the metal-containing solid and a solid-depleted solution.

The alkylene glycol is generally present in an amount of about 75 to about 98 wt % based on the total weight of the spent electropolishing solution. Within this range, it may be present in an amount of greater than or equal to about 80, preferably greater than or equal to about 85, and more preferably greater than or equal to about 90 wt %. Within this range, it is also preferable to have the alkylene glycol present in an amount of less than or equal to about 97 wt %, more preferably present in an amount of less than or equal to about 96 wt % and even more preferably less than or equal to about 95 wt %.

The chloride salt is generally present in an amount of about 2 to about 25 wt % based on the total weight of the spent electropolishing solution. Within this range it may be present in an amount of greater than or equal to about 3, preferably greater than or equal to about 4, and more preferably greater than or equal to about 5 wt %. Within this range it is also preferable to have the chloride salt present in an amount of less than or equal to about 20 wt %, more preferably present in an amount of less than or equal to about 15 wt % and even more preferably less than or equal to about 10 wt %.

The electropolishing solution can be used to electropolish a number of different metals or metallic alloys such as, for example, those comprising aluminum, titanium, vanadium, chromium, manganese, iron, cobalt, nickel, copper, niobium, molybdenum, silver, hafnium, tungsten, platinum, gold, and the like, and combinations comprising at least one of the foregoing metals. Metal alloys suitable for electropolishing include various stainless steels, as well as the nickel-chromium alloys available commercially under the tradename INCONEL®. As stated above, during the electropolishing process, fine metal-containing solid by-products are formed that cannot be easily separated from the spent electropolishing solution. No appreciable settling of the metal-containing solids occurs over extended periods of time. These metal-containing solids generally exist in the electropolishing solution in the form of a suspension. Such suspensions are also often referred to by other standard terms of art such as colloidal solutions, colloidal suspensions, dispersions, microphase-separated solutions, and the like. In one embodiment, when titanium metal or titanium-based alloys are subjected to electropolishing, the spent electropolishing solution contains a titanium-containing solid comprising about 10 to about 25 weight percent titanium, about 5 to about 20 weight percent carbon, and about 1 to about 5 weight percent hydrogen, on a dry weight basis. Within the above compositional ranges, the titanium content may be at least about 12 weight percent or at least about 14 weight percent, and up to about 23 weight percent or up to about 21 weight percent; the carbon content may be at least about 8 weight percent or at least about 11 weight percent, and up to about 18 weight percent or up to about 16 weight percent; and the hydrogen content may be at least about 2 weight percent or at least about 3 weight percent, and up to about 4 weight percent. Such compositions may be determined by standard analytical techniques as described in the working examples.

In order to recover components of the spent electropolishing solution for recycling, it is generally desirable to separate the metal-containing solids from the spent solution. This can be achieved by agitating the spent electropolishing solution at a temperature preferably greater than or equal to about 100° C. and preferably in the presence of water. Atmospheric moisture, i.e., the water present in air, may be sufficient to facilitate the separation of the metal-containing solids. Without wishing to be limited by any particular theory, the present inventors believe that the water facilitates the dissolution of the metal-containing solids and that the agitation facilitates reprecipitation and growth or agglomeration of the metal-containing solids into larger sized particles that are generally easier to separate from the spent electropolishing solution.

Water may, optionally, be added to the spent electropolishing solution in an amount of about 0.001 wt % to about 5 wt % based on the total weight of the spent electropolishing solution after water addition. Within this range water may be added in amounts greater than or equal to about 0.01 wt %, preferably greater than or equal to about 0.1 wt %, and more preferably greater than or equal to about 0.5 wt %. Within this range it may also be desirable to add water in amounts less than or equal to about 4 wt %, preferably less than or equal to about 3 wt %, and more preferably less than or equal to about 2 wt %.

The use of an elevated temperature during agitation is believed to expedite the processes of reprecipitation and growth of the metal-containing solids into larger sized precipitates that are generally easier to separate from the spent electropolishing solution. The selection of an elevated temperature will depend on the alkylene glycol employed. When the alkylene glycol comprises ethylene glycol, it is generally desirable to agitate the spent electropolishing solution at a temperature of about 100° C. to about 170° C. Within this range, temperatures of greater than or equal to about 110° C. are preferred, with temperatures of greater than or equal to about 115° C. especially preferred. It is also desired to maintain the elevated temperature during agitation at less than or equal to about 160° C. and more preferably at less than or equal to about 150° C.

Agitation may be accomplished by batch processes or continuous processes. Suitable agitation processes include, for example, tumbling, rolling, mixing, ball milling, pumping, ultrasonic stimulation, sparging, spinning, and combinations comprising at least one of the foregoing processes. When batch processes are utilized it may be desirable to add a small amount of water to the spent electropolishing solution either prior to or during agitation in order to promote the dissolution of the metal-containing solids. When continuous processes are utilized it may be desirable to continuously meter in the requisite quantity of water to facilitate dissolution. In one embodiment, the amount of agitation energy input per unit mass of spent electropolishing solution is generally from about 10,000 to about 1,000,000 joules/kilogram (J/kg). Within this range, the agitation energy may preferably be at least about 50,000 J/kg, more preferably at least about 100,000 J/kg. Also within this range, the agitation energy may preferably be up to about 800,000 J/kg, more preferably up to about 600,000 J/kg. This input energy is the energy utilized specifically for purposes of agitation of the spent electropolishing solution and excludes other types of energy used during the processes of recovery such as heating, cooling, and the like.

The preferred method of agitation is sparging with pressurized air. Other suitable pressurized gases such as nitrogen, hydrogen, helium argon, oxygen, and the like, and combinations comprising at least one of the foregoing may also be used. During the sparging, the pressurized gas may be bubbled through a water bath in order to increase its water content prior to coming into contact with the spent electropolishing solution. In one embodiment, water added to facilitate solid separation may be removed from the solid-depleted solution so that it can be re-used as an electropolishing solution. Water may also be present in the solid-depleted solution because it is often used to rinse electropolished products to remove the electropolishing solution from the electropolished products. Water may be separated from the solid-depleted solution by any technique effective for separating it from the alkylene glycol. A presently preferred technique is fractional distillation.

The pressurized gas may have a pressure of about 0.01 kg/cm$^2$ to about 1000 kg/cm$^2$. Within this range the pressure may be maintained at an amount of greater than or equal to about 0.1 kg/cm$^2$, preferably greater than or equal to about 1 kg/cm$^2$. Within this range it is also desirable to maintain the pressure at less than or equal to about 500 kg/cm$^2$, preferably less than or equal to about 250 kg/cm$^2$.

The pressurized gas may contain an amount of water effective to produce a water concentration of about 0.001 wt % to about 5 wt % in the spent electropolishing solution during agitation.

The metal-containing solid after agitation may have an average particle size greater than or equal to about 20 micrometers, preferably greater than or equal to about 50 micrometers, and more preferably greater than about 100 micrometers. This increase in the size of the metal-containing solid particles during agitation facilitates the ability to separate the metal-containing solid from the spent electropolishing solution and thus improves the efficiency of recovery of the electropolishing solution. In one embodiment, agitation of the spent electropolishing solution results in an increase of the average particle size of the metal-containing solid of at least 50%, preferably at least 100%, more preferably at least 200%.

The method comprises separating the agitated, spent electropolishing solution to yield the metal-containing solid and a solid-depleted solution. This separation may be conducted any time after the start of agitation or, if desired, after the agitation has been completed. The recovery may be accomplished by separation processes such as, for example, filtration, decantation, magnetic separation, centrifugation, hydrocyclonation, gravitational separation, membrane separation, and the like, and combinations thereof. The separation process should generally be capable of recovering a solid-depleted solution having a weight of at least about 1 wt %, preferably at least about 10 wt %, more preferably at least about 20 wt %, and most preferably at least about 50 wt % of the weight of the spent electropolishing solution.

In one embodiment, a method of recovering an electropolishing solution comprises: sparging a spent electropolishing solution with pressurized air, wherein the spent electropolishing solution comprises about 75 to about 98 weight percent of ethylene glycol, about 2 to about 25 weight percent of potassium chloride, and at least 1 weight percent of a titanium-containing solid comprising about 10 to about 25 weight percent titanium, about 5 to about 20 weight percent carbon, and about 1 to about 5 weight percent hydrogen, on a dry weight basis; and separating the sparged, spent electropolishing solution to yield the titanium-containing solid and a solid-depleted solution.

In another embodiment, the spent electropolishing solution is maintained at a temperature greater than about 100° C. and is agitated by sparging with compressed air for a suitable period of time. After the sparging is completed, the sparged solution is then allowed to settle for about 1 to about 5 hours, during which some of the larger particles formed during the sparging begin to settle to the bottom of the solution. The spent electropolishing solution is then subjected to filtration in a filter press wherein an appropriate filter material such as diatomaceous earth (e.g., CELITE® commercially available from World Minerals, Santa Barbara, Calif.) is used.

The invention is further illustrated by the following non-limiting examples.

EXAMPLES 1–8

All of the substrates described below were electropolished in an electrolyte comprising about 95 wt % ethylene glycol, about 5 wt % potassium chloride, and a water content of less than 0.01 wt %. The temperature was 115° C. and the current density was 2 A/cm$^2$ with a voltage was about 30–60V. The electropolishing time was two minutes. The cathodes were 6 centimeter by 6 centimeter by 0.158 centimeter stainless steel 304 plates. The surface roughness was measured with a profilometer.

For Example 1, the substrate was a titanium 6-4 coupon (titanium 6-4 is an alloy containing about 6 weight percent aluminum, about 4 weight percent vanadium, and the balance titanium). After electropolishing at a maximum metal removal rate of 0.00125 inches per minute, a smooth and shining surface was obtained. The surface roughnesses before and after electropolishing were 50 and 15 microinches, respectively.

For Example 2, the substrate was a titanium 6-4 engine blade. After electropolishing at a maximum metal removal rate of 0.001 inches per minute, a smooth and shining surface was obtained. The surface roughnesses before and after electropolishing were 37 and 18 microinches, respectively.

For Example 3, the substrate was a stainless steel 316 coupon (stainless steel 316 is an alloy containing about 17 weight percent chromium, 12 weight percent nickel, 2.5 weight percent molybdenum. 2 weight percent manganese, 1 weight percent silicon, 0.045 weight percent phosphorus, 0.03 weight percent sulfur, and the balance iron). After electropolishing, a smooth and shining surface was obtained.

For Example 4, the substrate was a stainless steel engine blade. After electropolishing a smooth and shining surface was obtained.

For Example 5, the substrate was an INCONEL® coupon. After electropolishing a smooth and shining surface was obtained.

For Example 6, the substrate was an INCONEL® engine blade. After electropolishing a smooth and shining surface was obtained.

For Example 7, the substrate was a gold wire. After electropolishing a smooth and shining surface was obtained.

For Example 8, the substrate was a platinum wire. After electropolishing a smooth and shining surface was obtained.

EXAMPLE 9

65 milliliters (ml) spent electropolishing solution comprising ethylene glycol and potassium chloride in a 95:5 ratio by weight and 35 wt % titanium-containing solid was heated to an elevated temperature of 115° C. in a glass beaker. While at the elevated temperature, the spent electropolishing solution was sparged with compressed air for one hour. Following sparging, the metal-containing solid particles began to settle. After about 20 minutes it was observed that about 20 ml of clear electropolishing solution was formed in the beaker while about 45 ml of a sediment bed remained at the bottom of the beaker.

EXAMPLE 10

In order to demonstrate the effectiveness of recovered electropolishing solution, spent electropolishing solution containing about 35 wt % titanium-containing solid, ethylene glycol and potassium chloride (in a weight ratio of 95:5, respectively) was mixed with water. The spent electropolishing solution to water ratio was maintained at 10:90 by weight. After distillation, the recovered electropolishing solution was reused to electropolish titanium metal and no changes in the electropolishing behavior were observed.

EXAMPLES 11–13

Three metal-containing solids were prepared and analyzed for titanium, carbon, hydrogen, and nitrogen contents. An electropolishing solution containing 95 weight percent ethylene glycol and 5 weight percent potassium chloride was used to electropolish a titanium surface, producing a spent electropolishing solution with a fine, suspended solid. The spent electropolishing solution was treated three ways. For Example 11, it was filtered on 1 micron filter paper, dried, and analyzed without agitation. For Example 12, it was agitated with pressurized air for about 60 minutes at 115° C., then filtered, dried, and analyzed. For Example 13, it was agitated with pressurized air for about 5 minutes at 150° C., then filtered, dried, and analyzed. Before analysis, samples were dried in a vacuum oven at about 50° C. to remove residual ethylene glycol. For each dried sample, carbon/hydrogen/nitrogen analyses were conducted with a Carlo Erba EA1108 Analyzer, which uses a quantitative flash combustion of the sample at 1020° C. in an oxygen-enriched atmosphere to form $CO_2$, $H_2O$, and $NO_x$ from carbon, hydrogen, and nitrogen, respectively; the combustion gases are passed through heated elemental copper to reduce all forms of $NO_x$ to $N_2$ and then carried through a chromatographic column where they are separated and quantitatively detected by a thermal conductivity detector. For titanium analyses, samples were digested in a 9:1 weight ratio of nitric and perchloric acids, and the residue was dissolved in 20 ml of a 1:1 mixture of hydrofluoric and hydrochloric acids and diluted to 50 mL with deionized water. The solutions were then diluted an additional 20-fold for analysis by solution nebulization ICP-AES on a Varian Liberty II instrument. Elemental analysis results are presented in Table 1. Ranges represent the highest and lowest values determined for multiple portions of each sample.

TABLE 1

Element Concentrations in Weight Percent

| | Example 11 | Example 12 | Example 13 |
|---|---|---|---|
| Hydrogen | 3.40–3.50 | 3.45–3.48 | 3.51–3.78 |
| Carbon | 11.61–12.14 | 11.50–11.85 | 12.58–14.01 |
| Nitrogen | <0.5 | <0.5 | <0.5 |
| Titanium | 20.3–20.7 | 18.9 | 15.9–16.7 |

In summary, an economical, environmentally friendly electropolishing solution and method has been provided, as well as a solution recovery methods that facilitates solution re-use and further reduces electropolishing costs and environmental impact.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

What is claimed is:

1. An electropolishing solution, comprising:
   about 75 to about 99 weight percent of an alkylene glycol;
   about 1 to about 25 weight percent of a chloride salt selected from the group consisting of alkali metal chlorides, alkaline earth metal chlorides, and combinations thereof; and
   less than or equal to 5 weight percent water.

2. The electropolishing solution of claim 1, wherein the alkylene glycol is selected from the group consisting of ethylene glycol, 1,2-propylene glycol, 1,3-propylene glycol, glycerol, 1,3-butylene glycol, 1,4-butylene glycol, 2,3-butylene glycol, 1,5-pentanediol, 1,6-hexanediol, 1,8-octanediol, 1,9-nonanediol, 1,10-decanediol, neopentyl glycol, 1,4-cyclohexanedimethanol, 2-methyl-1,3-propanediol, 2,2,4-trimethyl-1,3-pentanediol, diethylene glycol, dipropylene glycol, triethylene glycol, tripropylene glycol, dibutylene glycol, polyethylene glycol, polypropylene glycol, polytetramethylene glycol, and combinations thereof.

3. The electropolishing solution of claim 1, wherein the alkylene glycol comprises ethylene glycol or propylene glycol.

4. The electropolishing solution of claim 1, wherein the chloride salt is selected from the group consisting of lithium chloride, sodium chloride, potassium chloride, magnesium chloride, calcium chloride, and combinations thereof.

5. The electropolishing solution of claim 1, wherein the chloride salt comprises potassium chloride.

6. The electropolishing solution of claim 1, comprising less than 0.5 weight percent fluoride ion.

7. An electropolishing solution, comprising:
   about 75 to about 99 weight percent of ethylene glycol;
   about 1 to about 25 weight percent of potassium chloride; and
   less than or equal to 5 weight percent water.

8. An electropolishing solution, consisting essentially of:
   about 75 to about 99 weight percent of ethylene glycol;
   about 1 to about 25 weight percent of potassium chloride; and
   less than or equal to 5 weight percent water.

9. An electropolishing method, comprising:
   disposing a metallic substrate and at least one electrode in an electrolyte solution; wherein the electrolyte solution comprises
   about 75 to about 99 weight percent of an alkylene glycol;
   about 1 to about 25 weight percent of a chloride salt selected from the group consisting of alkali metal chlorides, alkaline earth metal chlorides, and combinations thereof; and
   less than or equal to 5 weight percent water,
   applying a current from a power source between the at least one electrode and the metallic substrate to remove metal from the metallic substrate.

10. The electropolishing method of claim 9, wherein the current is applied using a voltage of about 3 to about 100 volts.

11. The electropolishing method of claim 9, wherein the current is applied at a current density of about 0.1 to about 20 amperes per square-centimeter.

12. The electropolishing method of claim 9, wherein the electrolyte solution has a temperature of about 50 to about 200° C.

13. The electropolishing method of claim 9, wherein metal is removed from the metallic substrate at a rate of about 1 to 200 micrometers per minute.

* * * * *